United States Patent [19]

Blom

[11] 4,405,404

[45] Sep. 20, 1983

[54] APPARATUS FOR OXYGENATING AN EXTRUDED MOLTEN POLYETHYLENE FILM

[75] Inventor: Fritz Blom, Westphalia, Fed. Rep. of Germany

[73] Assignee: Windmoller & Holscher, Lengerich, Fed. Rep. of Germany

[21] Appl. No.: 326,212

[22] Filed: Dec. 1, 1981

[30] Foreign Application Priority Data

Dec. 2, 1980 [DE] Fed. Rep. of Germany ....... 3045413

[51] Int. Cl.³ ................ B29D 7/02; B32B 31/14; B32B 31/22
[52] U.S. Cl. .................. 156/497; 156/244.23; 156/500
[58] Field of Search ............... 156/244.23, 244.24, 156/497, 500; 427/39, 299, 444

[56] References Cited

U.S. PATENT DOCUMENTS 3,075,868  1/1963  Long .................. 156/244.23

FOREIGN PATENT DOCUMENTS 1053173  12/1966  United Kingdom .

Primary Examiner—Caleb Weston
Attorney, Agent, or Firm—Fleit, Jacobson, Cohn & Price

[57] ABSTRACT

In a method of oxygenating an extruded molten polyethylene film before it is pressed onto a carrier web between a pressure roller and a backing roller, ozone is blown onto the web substantially in the direction of web movement in the zone thereof where it enters the nip of the rollers.

2 Claims, 1 Drawing Figure

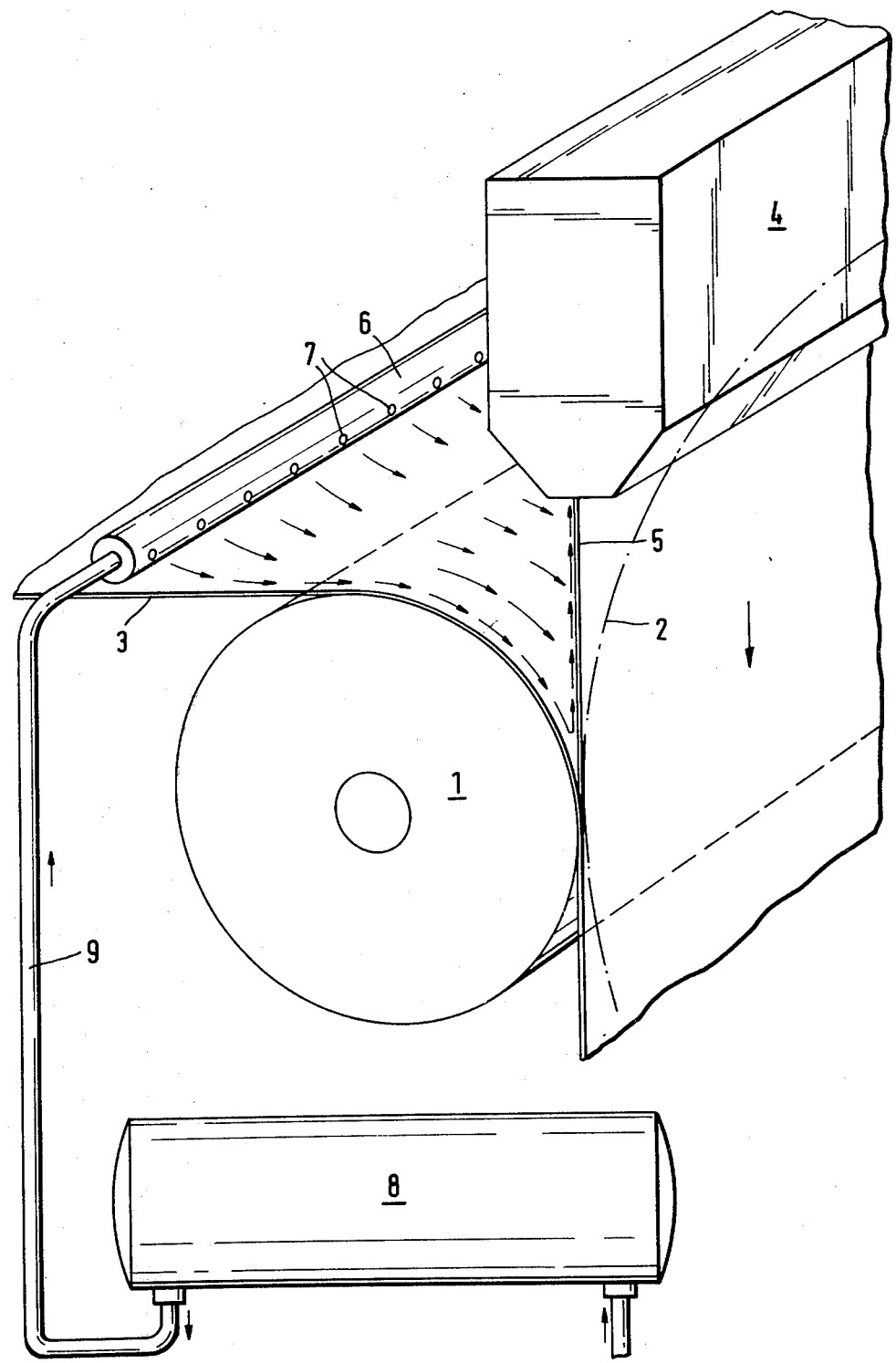

APPARATUS FOR OXYGENATING AN EXTRUDED MOLTEN POLYETHYLENE FILM

The invention relates to a method of oxygenating an extruded molten polyethylene film prior to compressing it with a carrier web for joining thereto, wherein ozone is passed through the gap formed between the carrier web and the polyethylene film, as well as to an apparatus for performing this method.

In the coating of paper and plastics webs as well as metal foils with polyethylene, one encounters the problem of securely joining the carrier web to the extruded polyethylene layer. To achieve a good bond between the molten or plastic polyethylene film and the carrier web, it is known to pretreat the surface of the carrier web by corona spark discharge or to apply an intermediate layer to the carrier web that will join well thereto as well as to the polyethylene layer.

Treatment by corona spark discharge does not in all cases result in a satisfactory bond and the application of an intermediate layer for enhancing the bond not only necessitates additional manufacturing costs but such intermediate layers also fail to attain proper bonding until after the expiry of several hours.

It is known that oxidation of the extruded polyethylene film directly before its application to the carrier web will lead to a good bond. To avoid the aforementioned disadvantages of the known bond-enhancing methods, a method has therefore already been suggested in which the extruded polyethylene film has ozone blown onto it for the purpose of oxygenating same. Ozone is one of the most intensive oxidation agents because it readily decomposes, particularly under the effect of heat, whereby highly reactive atomic oxygen is released.

However, it is a disadvantage in these known methods that the ozone will, for example in the manner seen from DE-GM No. 74 23 544, be blown against the polyethylene film that has just been extruded, either above the nip between the pressure roller and the cooling roller or directly into the nip. It is believed that this manner of blowing with ozone does not lead to a good bond because the turbulent flow existing in and above the gap fails to make adequate contact with the surface layers to be oxygenated and because the ozone is sucked off prior to being utilized and together with the polyethylene vapours by the suction means with which every extruder is equipped.

It is therefore the problem of the present invention to suggest a method and apparatus which permits the blowing of ozone in a manner such that the surface layers are adequately oxygenated in order to achieve a good bonding effect.

According to the invention, this problem is solved in a method of the aforementioned kind in that the ozone is blown on the web substantially in the direction of web movement in the ozone thereof entering the gap. Investigations have confirmed that with this kind of ozone introduction one can achieve good oxygenation of the surface layers and thus a good bond. Presumably, the good bond is achieved in accordance with the method of the invention because the blown-on ozone forms a laminar flow which is moved along with the carrier web close to the surface thereof and penetrates deeply into the gap and is subsequently sucked off upwardly along the hot film of polyethylene by means of the suction device on the extruder. Since in the method of the invention the ozone is blown into the laminar air flow of the carrier web near the surface thereof or actually forms such a laminar air flow near the surface, not only the surface of the carrier web but also the polyethylene film is intensively impinged by the highly active ozone. Blowing the ozone onto the carrier web in accordance with the invention is particularly advantageous where the carrier web is of plastics material, for example polypropylene or cellulose.

In an apparatus for performing the method of the invention and comprising a pressure roller and a cooling roller forming a backing roller, a wide slot extrusion nozzle disposed above the nip of the rollers, and an ozone nozzle, it is provided that the ozone nozzle comprises a tube which has blow nozzles arranged in a row, is disposed above the carrier web parallel to the axis of the pressure roller, and touches or almost touches the carrier web in the region where it runs onto the pressure roller, the direction of blowing by the nozzles being substantially tangential to the pressure roller. Instead of the row of blow nozzles, the tube may also be provided with one or more slotshaped blow nozzles.

One example of the invention will now be described in more detail with reference to the drawing in which the single FIGURE is a side elevation of the apparatus for oxygenating the webs that are to be joined together shown in a perspective view.

By way of guide and take-off rollers (not shown), a carrier web 3 of paper runs over the pressure roller 1 which is applied to a cooling roller 2. Above the nip formed between the pressure roller 1 and cooling roller 2, there is the wide-slot nozzle of an extruder 4 which is only shown diagrammatically. A molten polyethylene film is extruded out of the wide-slot nozzle in the illustrated manner and it meets the carrier web 3 in the nip.

For the purpose of oxygenating the surfaces, a blow tube 6 provided above the carrier web 3 closely in front of the pressure roller 1 is provided at equal intervals with a row of blow nozzles 7. The stream of gas ejected from the nozzles 7 is directed substantially tangentially onto the pressure roller 1.

The ozone leaving the nozzles 7 is produced in the ozone generator 8 and fed to the blow tube 6 through the conduit 9. As will be evident from the drawing, the blow tube 6 is arranged so that the stream of ozone leaving the nozzles 7 reaches the laminar air stream moved along with the carrier web 3 or it actually replaces same. The arrows show the path of the ozone flow and this course of the ozone has been substantiated by experiments with wisps of smoke. Thus, the flow of ozone is at first disposed closely on the surface of the carrier web 3 and then wanders into the nip in the manner shown. It reverses its direction in the nip and flows against the direction of movement of the extruded polyethylene film over the surface thereof. The stream of ozone is then withdrawn by the suction means (not shown) of the extruder.

I claim:

1. An apparatus for oxygenating an extruded molten polyethylene film before compressing it with a carrier web for joining thereto comprising a pressure roller and a cooling roller forming a backing roller, a wide-slot extrusion nozzle disposed above the nip of the rollers, and an ozone nozzle, characterised in that the ozone nozzle comprises a tube (6) which has blow nozzles (7) arranged in a row, is disposed above the carrier web (3) parallel to the axis of the pressure roller (1), and touches or almost touches the carrier web (3) in the region where it runs onto the pressure roller, the direction of blowing by the nozzles being substantially tangential to the pressure roller (1).

2. Apparatus according to claim 1, characterised in that the tube (6) is provided with one or more blow nozzles in slot form.